United States Patent [19]

Nambu

[11] Patent Number: 4,577,327

[45] Date of Patent: Mar. 18, 1986

[54] DATA TRANSMISSION INCLUDING A REPEATER

[75] Inventor: Shigeo Nambu, Fuchu, Japan

[73] Assignee: Kabushiki Kaisha Toshiba, Kawasaki, Japan

[21] Appl. No.: 656,761

[22] Filed: Oct. 1, 1984

[30] Foreign Application Priority Data

Sep. 30, 1983 [JP] Japan ................................ 58-182656

[51] Int. Cl.[4] .............................................. H04L 5/16
[52] U.S. Cl. ..................................... 375/4; 178/71 R; 178/71 T; 455/15
[58] Field of Search ............ 179/170 R, 16 E, 16 EA; 375/3, 4; 455/9, 15, 16; 370/26, 75, 97; 178/70 R, 70 TS, 71 R, 71 N, 71 T

[56] References Cited

U.S. PATENT DOCUMENTS

| | | | |
|---|---|---|---|
| 3,499,985 | 3/1970 | Rowlands et al. | 178/70 R |
| 3,586,793 | 6/1971 | Neal | 178/70 R |
| 3,772,596 | 11/1973 | Edwards | 375/3 |
| 4,032,911 | 6/1977 | Melvin, Jr. | 455/15 |
| 4,154,978 | 5/1979 | Tu | 178/71 R |

OTHER PUBLICATIONS

"The Ethernet-A Local Area Network Data Link Layer and Physical Layer Specifications", Version 1.0, Sep. 30, 1980.

*Primary Examiner*—Benedict V. Safourek
*Attorney, Agent, or Firm*—Cushman, Darby & Cushman

[57] ABSTRACT

A repeater for a transmission system which can pass signals in either of two directions. Each direction has a signal detection circuit associated with it. Upon detection of the beginning of a signal, the signal detection circuit enables an associated driver to pass the signal in the appropriate direction and at the same time disables the other signal detection circuit so that a signal will pass in only one direction at a time. An end flag detecting circuit monitors for certain characteristics associated with the end of the signal, and upon detection causes both drivers to be disabled and both signal detection circuits to be reset so that they can again detect a signal passing in either direction.

4 Claims, 12 Drawing Figures

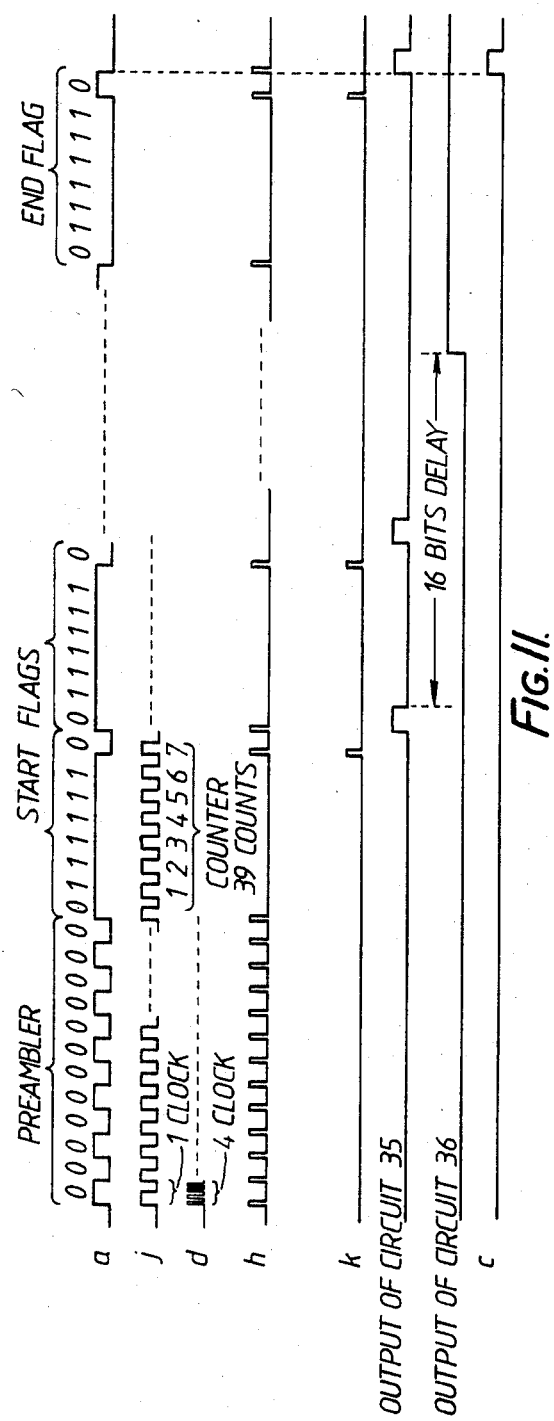
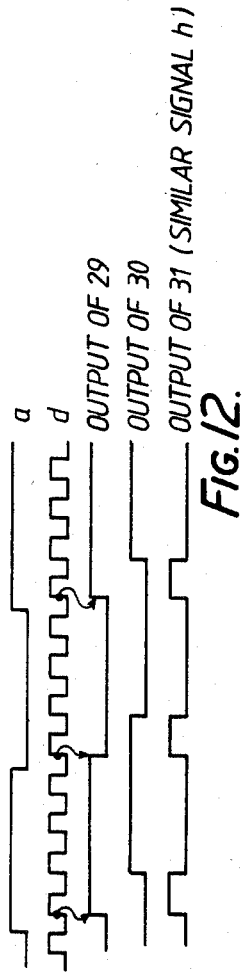
Fig.11.
Fig.12.

DATA TRANSMISSION INCLUDING A REPEATER

BACKGROUND OF THE INVENTION

1. Field of the Invention

This invention relates to data transmission systems and, more particularly, to data transmission systems including a repeater connecting transmission lines to which a plurality of node stations are connected in parallel.

2. Description of the Prior Art

In data transmission where a plurality of node stations are connected in parallel to the transmission line (a multidrop connection), when node stations transmit data at random, a plurality of signals can simultaneously appear on the same transmission line. Thus, proper transmission often cannot be performed. The interference of signals from at least two signal sources on the same transmission line is called a contention. In order to prevent the contention and to smoothly exchange data between the node stations, a set of given rules is introduced for a data link to control the transmission. The set of given rules is called a protocol. Various types of protocols are used in data transmission or communication.

However, when a lot of stations are connected to the transmission line or the transmission line is long, signal degradation occurs. Therefore, repeaters are inserted in the transmission line in order to amplify and reshape corresponding signals. FIG. 1 shows a model of a principle of a multidrop connection system. In FIG. 1, stations 1a through 1n are connected in parallel to line 3 and stations 2a through 2m are connected in parallel to line 4. Lines 3 and 4 are connected to opposite sides of repeater 5. Repeater 5 includes two channels, one for regenerating signals in each direction.

Typically, in the past, if station 1a is to communicate with station 2b, station 1a will issue a command. The command will pass through repeater 5 to station 2b. Station 2b will then process the command, formulate a response and second the response through repeater 5.

Repeater 5 (shown in FIG. 2), such as is disclosed in Japanese Patent Disclosure No 57-171864, includes receiver 6a through driver 7a for regenerating signals from line 3 to line 4. Receiver 6b and driver 7b regenerate signals from line 4 to line 3. When the command signal passes from station 1a and line 3 to line 4 and station 2b, switching circuit 8a disables receiver 6b and driver 7b to prevent feedback. The disabling continues until switching circuit 8a has determined that no signals are flowing from line 3 to line 4. This takes a certain period of time after the signal from line 3 actually stops.

During this time, station 2b is receiving the command and processing it. By the time station 2b is ready to transmit the response, receiver 6b and driver 7b should no longer be disabled so that the response from station 2b can pass through repeater 5.

However, recently, stations have been developed which can respond a very short time after receipt of a command. A problem exists, however, since typical repeaters must wait for a predetermined time before signals can pass in the opposite direction. Therefore, the being of the response may be clipped by the repeater.

The conventional system does have an advantage in that a relatively simple structure can be used for the data link. However, as discussed above, with fast responding stations, repeater 5 may clip a part of the response. This results because a station is able to detect the end of a signal (such as illustrated in FIG. 3) by an end flag associated with the signal and respond immediately, whereas the repeater must wait a predetermined period after the end of the signal to ensure that the signal has, in fact, ended. Thus, as shown in FIG. 5, repeater 5 waits for a checking period corresponding to 7 or 8 bits to guarantee that the signal has ended.

If the checking period is set up with less than 8 bits, then a signal with more than 5 consecutive bits in the same state may cause switches 8a and 8b to enable the other channel, thus interrupting the signal.

Thus, it is difficult for a conventional system to transmit data more efficiently, because conventional repeaters detect the end of the data signal by detecting the occurrence of a predetermined number of bits in the same state in the data signal (shown in FIG. 5).

SUMMARY OF THE INVENTION

Accordingly, it is an object of the present invention to provide a data transmission system which has an increased effective transmission speed.

It is another object of the present invention to provide a data transmission system including a repeater which can change between signals passing in opposite directions at an effective speed.

It is still another object of the present invention to provide a data transmission system wherein fidelity of data transmission is improved.

According to the method and apparatus of the present invention, a repeater transfers signals between first and second lines in first and second directions. The repeater monitors for signals passing in either of the directions and regenerates those signals. At the same time, it disables signals passing in the opposite direction. The signals are also monitored for a predetermined characteristic of the end of the signals and in response to the predetermined characteristic, the disabling of the opposite passing signals ends.

BRIEF DESCRIPTION OF THE DRAWINGS

Further objects and advantages of the present invention will become more apparent and more readily appreciated from the following detailed description of the presently preferred exemplary embodiment of the invention taken in conjunction with the accompanying drawings, of which:

FIG. 11 is timing charts for explaining the operation of the end flag detecting circuit; and FIG. 12 is an expanded view of selected signals associated with the end flag detecting circuit of FIG. 8.

DETAILED DESCRIPTION OF THE PRESENTLY PREFERRED EXEMPLARY EMBODIMENT

Figure 1:
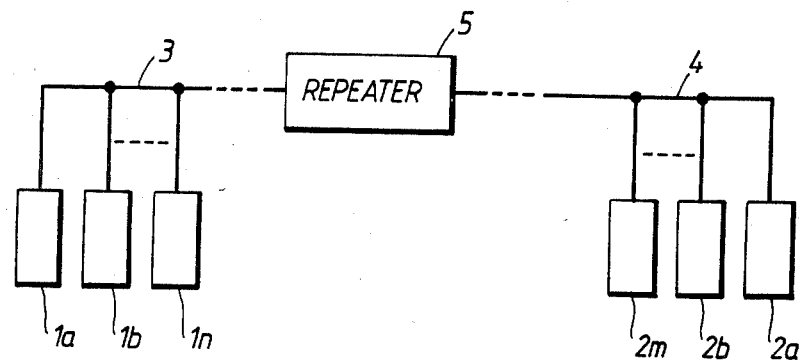
FIG. 1 is a block diagram showing a model of a multidrop connection system.
Figure 2:
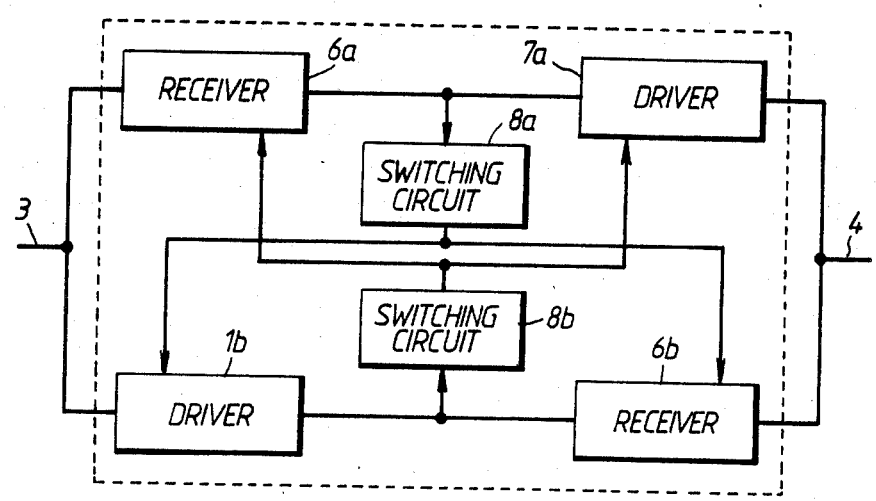
FIG. 2 is a schematic block diagram of a prior repeater apparatus.
Figure 3:
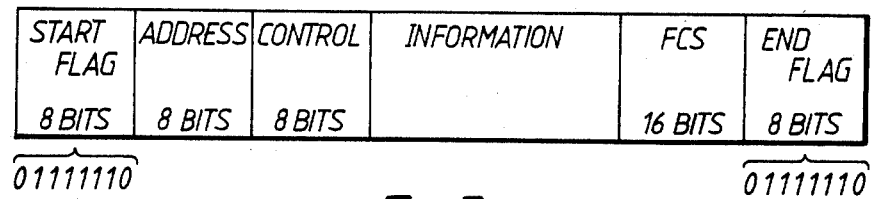
FIG. 3 is a diagram explaining frame structure of high level datalink control (HDLC)
Figure 4:
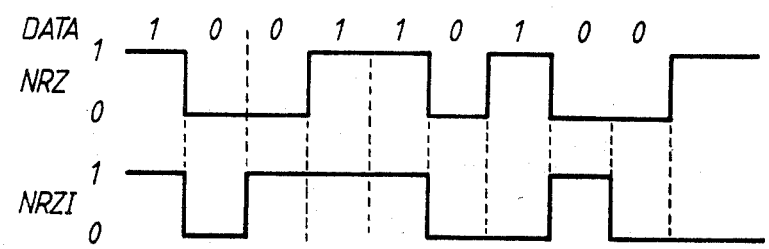
FIG. 4 is waveform diagrams of NRZ and NRZI signals.
Figure 5:
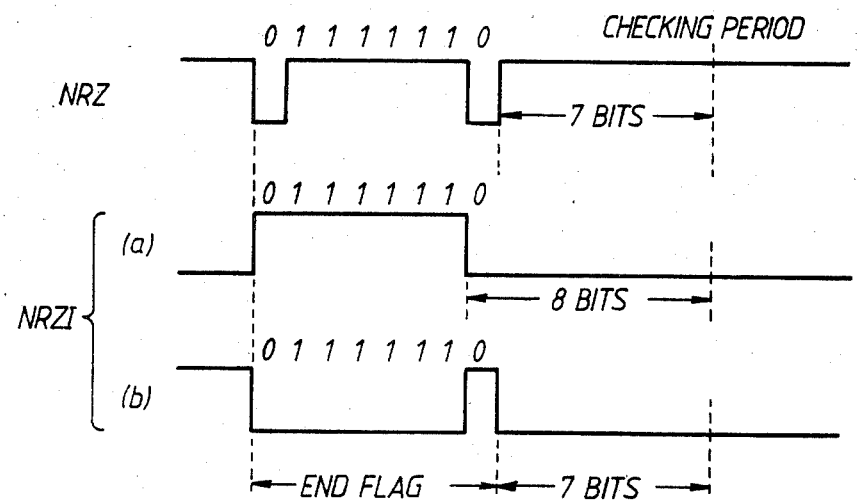
FIG. 5 is timing charts for explaining detecting the end flag of data represented by NRZ and NRZI signals.
Figure 6:
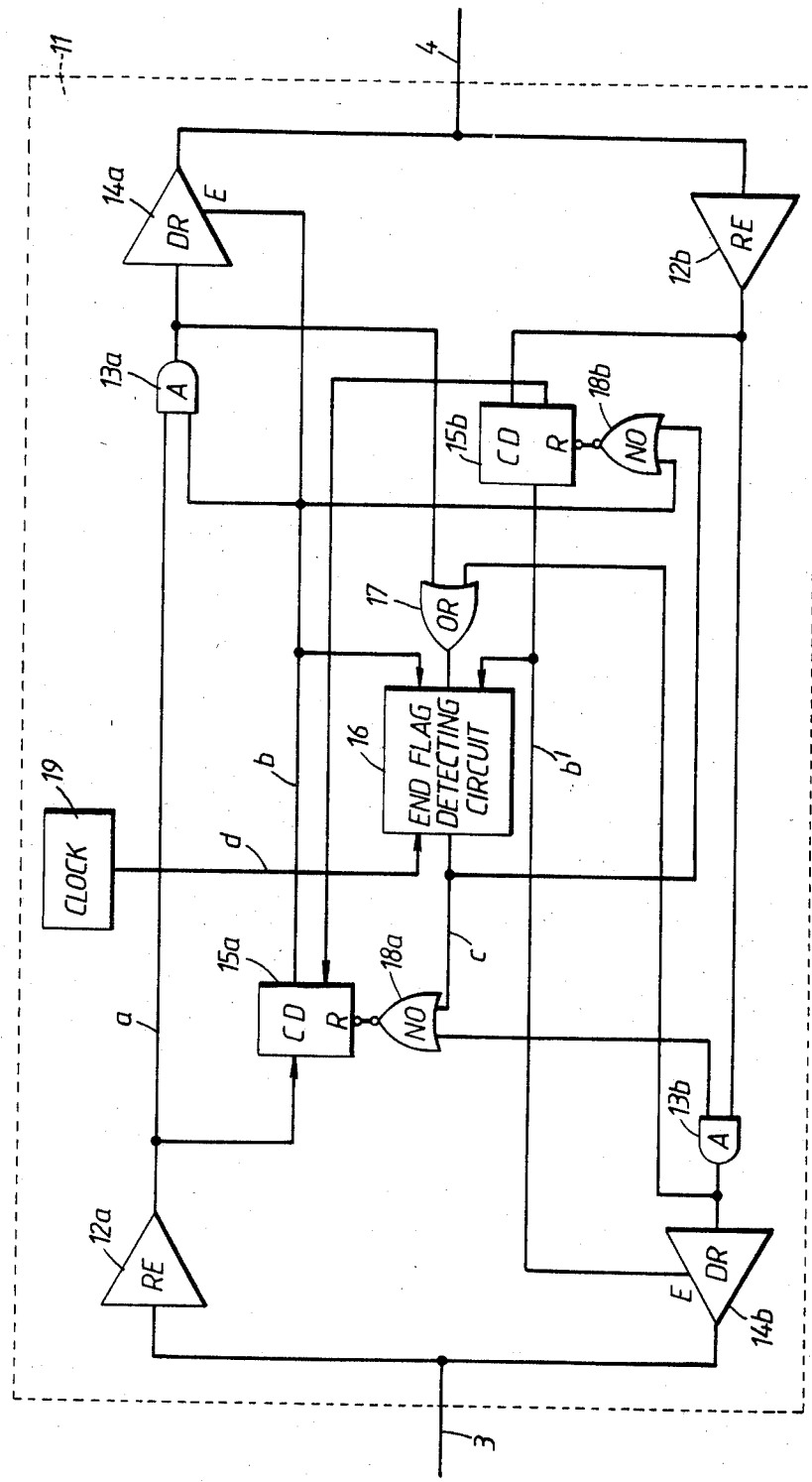
FIG. 6 is a circuit block diagram showing an example of a repeater of the present invention.

Referring now to FIG. 6, a transmission data signal a, including a start flag and an end flag, appearing on a transmission line 3 is applied to a first receiver 12a. Data signal a is represented by NRZ (nonreturn-to-zero) signal format or NRZI (nonreturn-to-zero-inverted) signal format (shown in FIG. 4). The signal conforms to HDLC (high level datalink control) frame structure (see FIG. 3). Receiver 12a amplifies and reshapes the data signal a and applies it to driver 14a through AND circuit 13a. Driver 14a outputs signal a to a transmission line 4.

The output of receiver 12a is also applied to a first signal detecting circuit 15a. First signal detecting circuit 15a outputs a gate signal b to an enable terminal of driver 14a, AND circuit 13a and end flag detecting circuit 16. End flag detecting circuit 16 also receives signal a outputted from AND circuit 13a through OR circuit 17. When end flag detecting circuit 16 detects the end flag in transmitted signal a, circuit 16 outputs gate reset signal c through NOR gates 18a and 18b to reset terminals of first and second signal detecting circuits 15a and 15b. The other input terminals of NOR gate circuits 18a and 18b receive transmission gate signals b and b', respectively outputted from first and second detecting circuits 15a and 15b. Constant periodical clock pulses d generated by a clock 19 are applied to detecting circuits 15a and 15b and end flag detecting circuit 16.

Data signals flowing in an opposite direction from second transmission line 4 are applied to transmission line 3 through a second receiver 12b, AND circuit 13b and second driver 14b similar to receiver 12a, AND circuit 13a and driver 14a mentioned above. Data signals through line 4 are also applied to second signal detecting circuit 15b and end flag detecting circuit 16 through OR circuit 17. Transmission gate signal b' from second signal detecting circuit 15b is applied to an enable terminal of second driver 14b, AND circuit 13b, NOR circuit 18a, and end flag detecting circuit 16.

Figure 7:
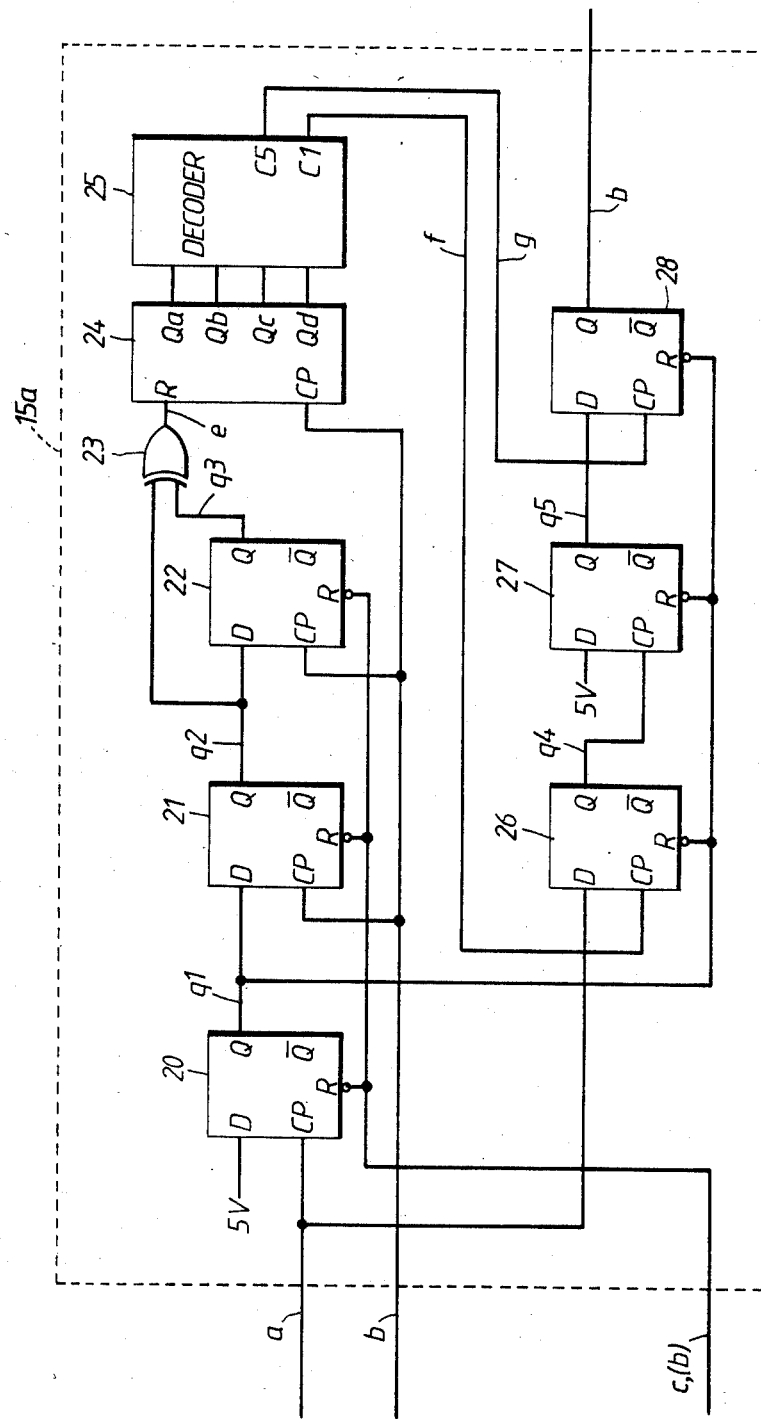
FIG. 7 is a diagram of a signal detecting circuit which may be used in the system shown in FIG. 6.

FIG. 7 is a circuit diagram of signal detecting circuit 15a. Signal detecting circuit 15b has the same structure as circuit 15a. Signal a outputted by receiver 12a is applied to a clock pulse terminal of first flip-flop (hereinafter referred to as "FF") 20. The D terminal of FF 20 is supplied with 5 volts. Output signal q1 from the Q terminal of FF 20 is applied to the D terminal of a second FF 21. Output signal q2 from the Q terminal of second FF 21 is applied to the D terminal of a third FF 22 and one terminal of exclusive OR circuit 23. Exclusive OR circuit 23 outputs a "0" level signal when two input terminal signals are the same level. When two input signals are different, exclusive OR circuit 23 outputs a "1" level signal.

Output signal q3 from the Q terminal of third FF 22 provides the other input for exclusive OR circuit 23. Output signal e of circuit 23 is applied to the reset terminal of counter 24. CP terminals of FFs 21 and 22 and counter 24 receive clock signal d generated by clock generator 19 in FIG. 6. The bit rate of clock signal d is 4 times faster than the bit rate of the data. Reset terminals of FFs 20, 21 and 22 are all connected to the output terminal of NOR circuit 18a so that they are responsive to receiving gate signal b or transmission gate reset signal c.

The output terminals of counter 24 are connected to a decoder 25. When the value of the digital signals applied to decoder 25 is "1", decoder 25 outputs a "1" level signal f to the CP terminal of fourth FF 26. When the value of the digital signals applied to decoder 25 is "5", decoder 25 outputs to the CP terminal of sixth FF 28 a "1" level signal. Transmission signal a is applied to the D terminal of FF 26. Signal q4 outputted from the Q terminal of FF 26 is applied to the CP terminal of fifth FF 27. The D terminal of fifth FF 27 receives 5 volts. Signal q5 outputted from the Q terminal of FF 27 is applied to sixth FF 28. The Q terminal output of sixth FF 28 is transmission gate signal b, which is applied to first driver 14a, etc. Output signal q1 of first FF 20 is applied to reset terminals of FFs 26, 27 and 28.

Figure 8:
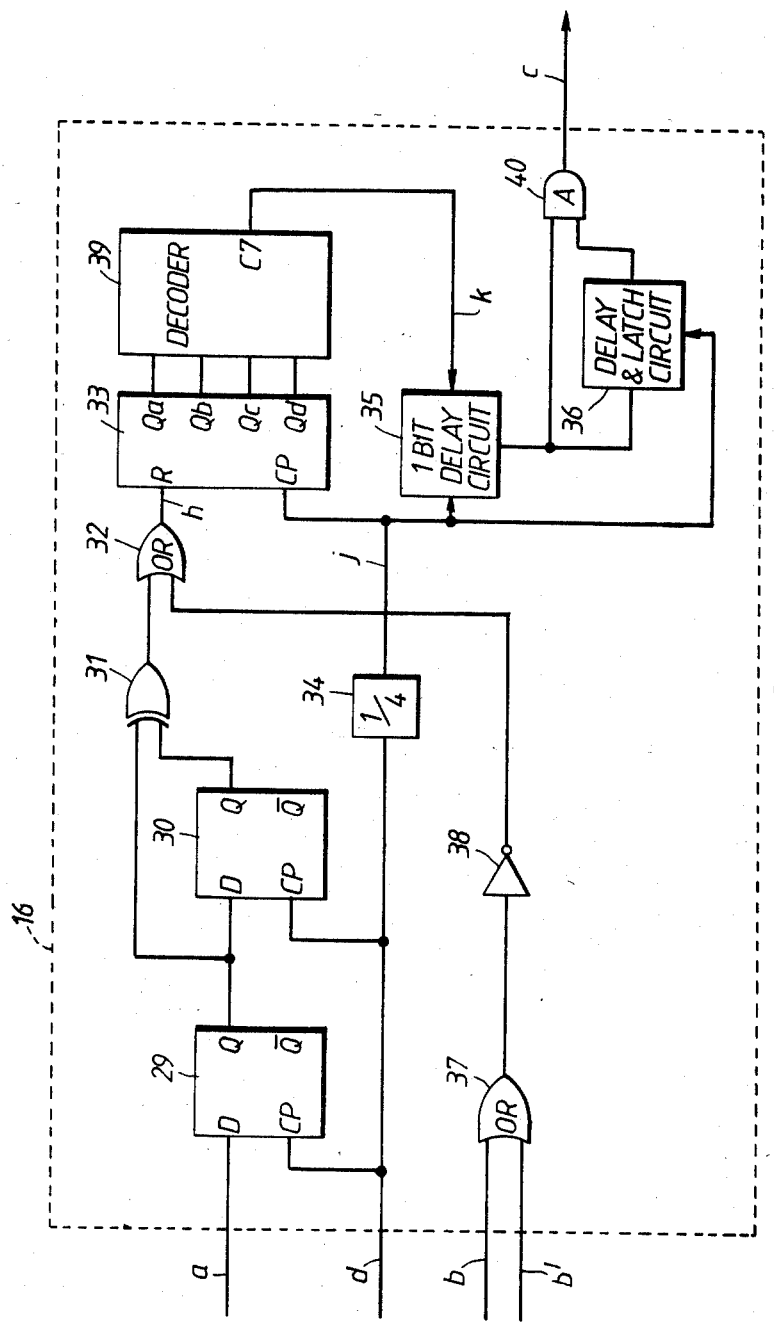
FIG. 8 is a diagram of an end flag detecting circuit which may be used in the system shown in FIG. 6.

FIG. 8 is a circuit diagram of an end flag detecting circuit which may be employed in FIG. 6. Data signal a received through OR circuit 17 is applied to the D terminal of a seventh FF 29. The output from the Q terminal of seventh FF 29 is applied to the D terminal of eighth FF 30 and one terminal of exclusive OR circuit 31. The output from the Q terminal of FF 30 is applied to the other input terminal of exclusive OR circuit 31, the output of which is applied to the reset terminal of counter 33 through OR circuit 32 as reset signal h.

Clock signal d is applied to the CP terminals of FFs 29 and 30 from clock pulse generator 19 in FIG. 6. Clock pulse signal d is divided by a factor of 4 by divider 34 and clock pulse signal j outputted from divider 34 is applied to a 1 bit delay circuit 35, the CP terminal of counter 33 and a delay and latch circuit 36. The frequency of clock signal j is one-fourth of that of clock signal d. Since clock signal d has a frequency four times the bit rate, clock signal j has a frequency at the bit rate. The other input terminal of OR circuit 32 is connected with the output terminal of inverter 38. Inverter 38 inverts the output of OR circuit 37 which receives transmission gate signals b and b' from signal detecting circuits 15a and 15b. The output of counter 33 is inputted to decoder 39. When the value of decoder 39 is "7", decoder 39 outputs to a 1 bit delay circuit 35 "1" level signal k. The 1 bit delay circuit delays any input signal by 1 bit, so signal k is delayed for a 1 bit period. After the delay, signal k is applied to an AND circuit 40 and delay and latch circuit 36. When circuit 36 receives an output from delay circuit 35, circuit 36 begins to count. After a count of 16 bits, delay and latch circuit 36 outputs a "1" level signal to AND circuit 40. The output of circuit 40 represents transmission gate reset signal c.

Figure 9:
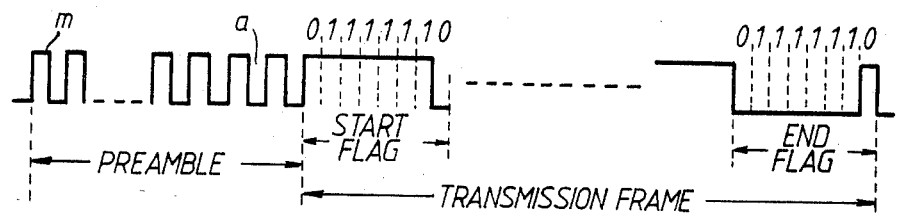
FIG. 9 is a diagram of a data signal.

The operation of the embodiment constructed in accordance with FIGS. 6, 7 and 8 will now be described with respect to the timing diagrams of FIGS. 9, 10, 11 and 12. FIG. 9 illustrates data signal a which is in NRZI format and has an HDLC frame structure. Note that both the start flag and the end flag each have 7 bits of the same level. Only the start and end flags may have 7 consecutive bits at the same level. The preamble of the signal, before the start flag, includes a series of bits which alternate between a high level and a low level, indicative of the series of zeroes in NRZI code.

Figure 10:
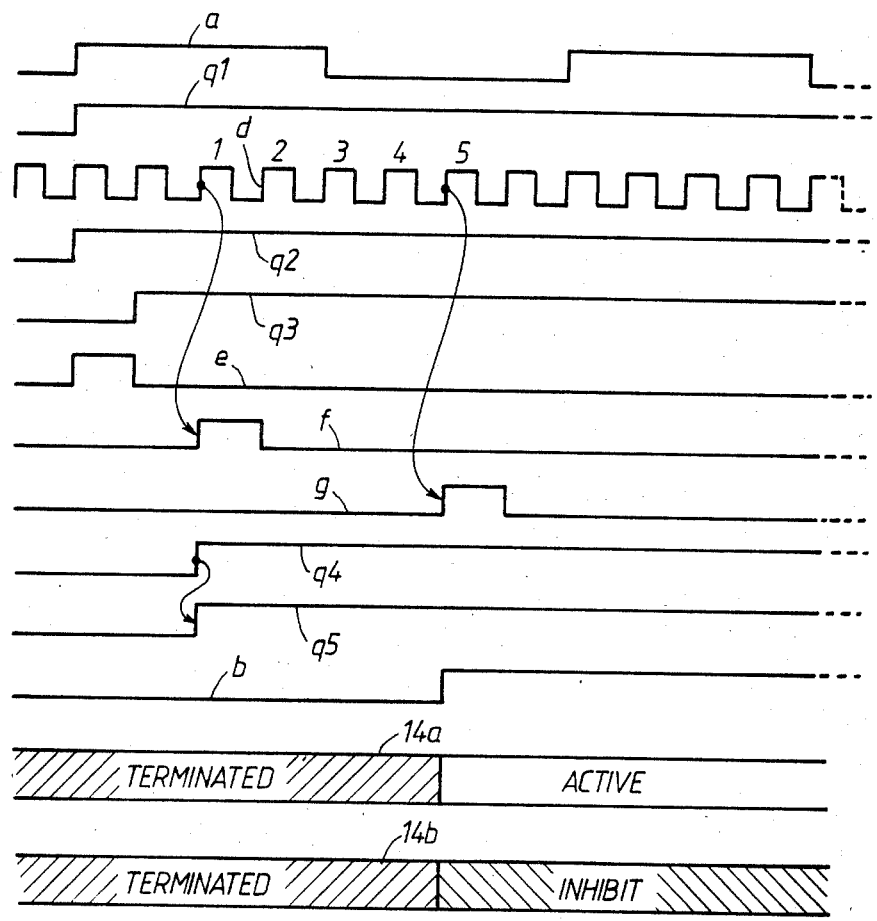
FIG. 10 is timing charts for explaining the operation of the signal detecting circuit.

When signal a is applied to first signal detecting circuit 15a, signal detecting circuit 15a generates signals illustrated in FIG. 10. When the first pulse of the preamble of signal a, shown in much expanded form in FIG.

10, is applied to the CP terminal of FF 20, the output of FF 20, signal q1, is set to a high level, since FF 20 is responsive to positive-going edges. At the same time, the output signal from FF 21, signal q2, assumes a high level since input signal q1 is at a high level.

At the same time, signal q2 is applied to one input of exclusive OR gate 23. At the next pulse of clock signal d, the output of FF 22, signal q3, becomes high in response to signal q2. Since gate 23 is an exclusive OR gate, its output, signal e, remains high from the time that signal q2 becomes high until signal q3 becomes high.

After signal e becomes low, releasing the reset of counter 24, counter 24 begins counting pulses of clock signal d. With the first pulse, the C1 output of decoder 25 assumes a high level which causes the output of FF 26, signal q4, to become high. This, in turn, causes the output of FF 27, signal q5, to become high.

The fifth pulse counted by counter 24 causes the C5 output of decoder 25, signal g, to become high, clocking FF 28. This causes FF 28 to produce a high output signal, signal b, indicative of a signal being received by receiver 12a.

Keep in mind that counter 24 is reset by signal e each time data signal a has a rising edge. This is because FF 20 is triggered by positive-going edges. Also, keep in mind that the pulses of clock signal d have a rate four times that of the data. Therefore, decoder 25 generates signal g in the middle of the low-going portion of the first cycle of the preamble signal, as illustrated in FIG. 10.

Furthermore, note that FF 26 is responsive to data signal a and signal f from decoder 25. As a result, FF 27 is clocked only when a high-going portion of data signal a is at a high level upon the occurrence of signal f. As a result, signal b is generated only at the beginning of each data signal a.

Signal b enables driver 14a and is applied to NOR gate 18b to hold second signal detecting circuit 15b in a reset condition, thus preventing circuit 15b from generating an output to enable driver 14b, even if receiver 12b receives a signal.

Thus, signal detecting circuit 15a detects the beginning of data signal a and employs that detection to enable driver 14a and disable driver 14b. Similarly, signal detecting circuit 15b detects data signals a from receiver 12b and upon detection enables driver 14b and disables driver 14a.

Turning now to end flag detecting circuit 16, illustrated in detail in FIG. 8, FF 29, FF 30 and exclusive OR gate 31 operate in a manner very similar to FF 21, FF 22 and exclusive OR gate 23 so that gate 31 produces a pulse with each positive-going and negative-going transition of data signal a (see FIG. 12). The output of exclusive OR gate 31 passes through OR gate 32 and is applied to counter 33 as a reset. Counter 33 is also reset when neither signal b nor signal b' exists, indicative of no signal being transmitted in either direction. When signal b or signal b' exists, it passes through OR gate 37 and inverter 38 to release the reset of counter 33.

The pulses of clock signal d, at four times the bit rate, are divided by a factor of 4 by divider 34 to produce signal j at the bit rate. After each resetting of counter 33, counter 33 counts the pulses of signal j at the bit rate. Each time that count reaches 7 bits, decoder 39 produces signal k (see FIG. 11). One bit later, delay circuit 35 produces an output applied both to delay and latch circuit 36 and AND gate 40. The output of delay circuit 35 applied to delay and latch circuit 36 causes the output of delay and latch circuit 36 to become high 16 bits after the initial input.

Note that only the start flags and the end flags of data signal a, as illustrated in FIG. 11, contain 7 bits having the same signal level. Thus, only the start flags and the end flag will produce signal k. The pulse in signal k is associated with the end of each start flag is delayed 1 bit by delay circuit 35 and applied to AND gate 40 and delay and latch circuit 36. However, 16 bits will not have passed from the end of the first start flag to the end of the last start flag so the output of delay and latch circuit 36 remains low throughout the start flags, as illustrated in FIG. 11. Therefore, signal c does not appear during the start flags at the output of AND gate 40. However, 16 bits after the end of the first start flag, the output of delay and latch circuit 36 becomes high, as illustrated in FIG. 11. Therefore, when the next pulse in signal k, associated with the end flag, is applied to delay circuit 35, signal c is produced 1 bit later.

Signal c is applied through NOR gates 18a and 18b to signal detecting circuits 15a and 15b to reset these circuits. Thus, as illustrated in FIG. 7, signal c resets FF 20, FF 21 and FF 22. The resetting of FF 22 causes FF 26, FF 27 and FF 28 to be reset, thus eliminating signal b. This disables driver 14a and releases signal detecting circuit 15b so that repeater 11 can cause the next signal to be transmitted from either direction.

Thus, repeater 11 can recognize the start of a transmission data signal having a protocol like HDLC by detecting the first pulse of a preamble of the signal to make first driver 14a active and second driver 14b inhibited. Furthermore, repeater 11 detects the end of the data signal by etecting its end flag, causing drivers 14a and 14b to be inhibited and causing signal detecting circuits 15a and 15b to be in a condition responsive to the next incoming signal.

Although only a single exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as set forth in the following claims.

What is claimed is:

1. A repeater comprising:
   a first terminal;
   a second terminal;
   first channel means for transferring signals from said first terminal to said second terminal;
   second channel means for transferring signals from said second terminal to said first terminal;
   first disabling means for disabling said second channel means upon detection of a signal in said first channel;
   second disabling means for disabling said first channel means upon detection of a signal in said second channel means; and
   end detecting means for monitoring signals in said first and second channels means for a predetermined characteristic of the end of said signals and deactivating at least one of said first and second disabling means in response to detection of said predetermined characteristic.

2. A data transmission system comprising:
   a first line;

a second line;
at least one station connected to said first line;
at least one station connected to said second line; and
repeater means for transferring signals between said first and second lines, said repeater means including:
  first channel means for transferring signals from said first line to said second line,
  second channel means for transferring signals from said second line to said first line,
  means for disabling one of said first and second channel means when a signal appears on the other of said first and second channel means, and
  end detecting means for monitoring signals in said first and second channel means for a predetermined characteristic of the end of said signals and deactivating said disabling means in response to said predetermined characteristic.

3. A method of regenerating signals passing in first and second opposite directions comprising the steps of:
  (a) monitoring for a signal passing in one of said first and second directions;
  (b) regenerating signals passing in said one direction in response to said step (a);
  (c) inhibiting signals passing in the other of said first and second directions in response to said step (a);
  (d) monitoring for a predetermined characteristic of the end of said signal passing in said one direction; and
  (e) stopping said inhibiting step (c) in response to detection of said predetermined characteristic in said step (d).

4. A method of transferring signals between stations connected to lines on opposite sides of a repeater, said method comprising the steps of:
  (a) monitoring for a signal passing through said repeater;
  (b) inhibiting signals passing through said repeater in a direction opposite said signal monitored by said step (a) in response to said step (a);
  (c) monitoring said signal for a predetermined characteristic of the end of said signal; and
  (d) stopping said inhibiting step (b) in response to said monitoring step (c).

* * * * *